United States Patent
Miyashita

(10) Patent No.: US 9,372,324 B2
(45) Date of Patent: *Jun. 21, 2016

(54) IMAGING LENS BARREL AND METHOD FOR CONTROLLING OPERATION OF THE SAME

(71) Applicant: FUJIFILM Corporation, Tokyo (JP)

(72) Inventor: Mamoru Miyashita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/624,594

(22) Filed: Feb. 18, 2015

(65) Prior Publication Data

US 2015/0160427 A1   Jun. 11, 2015

Related U.S. Application Data

(63) Continuation of application No. PCT/JP2013/069539, filed on Jul. 18, 2013.

(30) Foreign Application Priority Data

Aug. 30, 2012   (JP) ................................. 2012-189446

(51) Int. Cl.
  *G02B 7/02*   (2006.01)
  *G02B 7/09*   (2006.01)
  (Continued)

(52) U.S. Cl.
  CPC .............. *G02B 7/09* (2013.01); *G01D 5/2452* (2013.01); *G01D 5/24471* (2013.01); *G02B 7/08* (2013.01); *G03B 13/36* (2013.01)

(58) Field of Classification Search
  CPC ....................................................... G02B 7/102

USPC ............................................................ 359/826
See application file for complete search history.

(56) References Cited

U.S. PATENT DOCUMENTS

2015/0160429 A1* 6/2015 Miyashita ................ G02B 7/08
  359/824
2015/0163388 A1* 6/2015 Miyashita .......... G01D 5/24485
  359/824

FOREIGN PATENT DOCUMENTS

JP       6-58766       3/1994
JP     2006-29937     2/2006
(Continued)

OTHER PUBLICATIONS

Written Opinion of the International Searching Authority in corresponding PCT/JP2013/069539 dated Aug. 13, 2013.
(Continued)

*Primary Examiner* — James Jones
(74) *Attorney, Agent, or Firm* — Young & Thompson

(57) ABSTRACT

An imaging lens barrel includes: a barrel body; a rotating body; a first magnetic sensor; a second magnetic sensor; a phase difference calculation section; a correction table memory that stores a plurality of correction tables which are obtained when the imaging lens is moved at different speeds and are used to correct a difference between the phase difference calculated by the phase difference calculation section and a design value of the phase difference; a phase difference correction section configured to correct the phase difference calculated by the phase difference calculation section, using a correction table corresponding to a moving speed of the imaging lens among the plurality of correction tables; and an absolute position calculation section.

7 Claims, 19 Drawing Sheets

(51) Int. Cl.
*G02B 7/08* (2006.01)
*G01D 5/244* (2006.01)
*G01D 5/245* (2006.01)
*G03B 13/36* (2006.01)

(56) References Cited

FOREIGN PATENT DOCUMENTS

| JP | 2008-533476 | 8/2008 |
| JP | 2011-027999 | 2/2011 |
| JP | 2012-083313 | 4/2012 |

OTHER PUBLICATIONS

International Search Report PCT/JP2013/069539 dated Aug. 13, 2013.
Written Opinion of the International Searching Authority PCT/JP2013/069539 dated Aug. 13, 2013.

* cited by examiner

FIG. 8

MOVING DIRECTION OF ZOOM LENS : TELEPHOTO → WIDE
MOVING SPEED : HIGH

| PHASE DIFFERENCE | ... | x(n-2) | x(n-1) | x(n) | x(n+1) | x(n+2) | ... |
|---|---|---|---|---|---|---|---|
| AMOUNT OF CORRECTION | ... | Δ1(n-2) | Δ1(n-1) | Δ1(n) | Δ1(n+1) | Δ1(n+2) | ... |

FIG. 9

MOVING DIRECTION OF ZOOM LENS : TELEPHOTO → WIDE
MOVING SPEED : MEDIUM

| PHASE DIFFERENCE | ... | y(n-2) | y(n-1) | y(n) | y(n+1) | y(n+2) | ... |
|---|---|---|---|---|---|---|---|
| AMOUNT OF CORRECTION | ... | Δ2(n-2) | Δ2(n-1) | Δ2(n) | Δ2(n+1) | Δ2(n+2) | ... |

FIG. 10

MOVING DIRECTION OF ZOOM LENS : TELEPHOTO → WIDE
MOVING SPEED : LOW

| PHASE DIFFERENCE | ... | $z(n-2)$ | $z(n-1)$ | $z(n)$ | $z(n+1)$ | $z(n+2)$ | ... |
|---|---|---|---|---|---|---|---|
| AMOUNT OF CORRECTION | ... | $\Delta 3(n-2)$ | $\Delta 3(n-1)$ | $\Delta 3(n)$ | $\Delta 3(n+1)$ | $\Delta 3(n+2)$ | ... |

FIG. 12

MOVING DIRECTION OF ZOOM LENS: WIDE → TELEPHOTO
MOVING SPEED : HIGH

| PHASE DIFFERENCE | ... | X(n-2) | X(n-1) | X(n) | X(n+1) | X(n+2) | ... |
|---|---|---|---|---|---|---|---|
| AMOUNT OF CORRECTION | ... | Δ4(n-2) | Δ4(n-1) | Δ4(n) | Δ4(n+1) | Δ4(n+2) | ... |

FIG. 13

MOVING DIRECTION OF ZOOM LENS: WIDE → TELEPHOTO
MOVING SPEED : MEDIUM

| PHASE DIFFERENCE | ... | Y (n-2) | Y (n-1) | Y (n) | Y (n+1) | Y (n+2) |
|---|---|---|---|---|---|---|
| AMOUNT OF CORRECTION | ... | Δ5 (n-2) | Δ5 (n-1) | Δ5 (n) | Δ5 (n+1) | Δ5 (n+2) |

FIG. 14

MOVING DIRECTION OF ZOOM LENS: WIDE → TELEPHOTO
MOVING SPEED : LOW

| PHASE DIFFERENCE | ... | Z(n−2) | Z(n−1) | Z(n) | Z(n+1) | Z(n+2) | ... |
|---|---|---|---|---|---|---|---|
| AMOUNT OF CORRECTION | ... | Δ6(n−2) | Δ6(n−1) | Δ6(n) | Δ6(n+1) | Δ6(n+2) | ... |

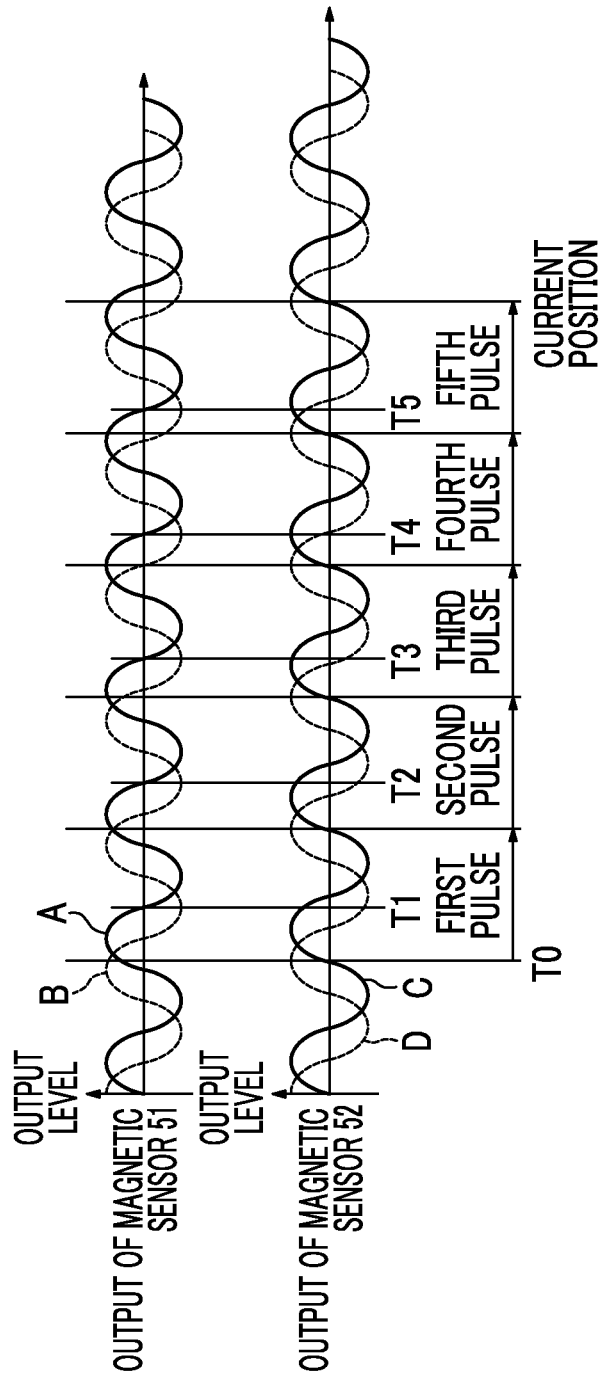

IMAGING LENS BARREL AND METHOD FOR CONTROLLING OPERATION OF THE SAME

CROSS-REFERENCE TO RELATED APPLICATIONS

This application is a Continuation of PCT International Application No. PCT/JP2013/069539 filed on Jul. 18, 2013, which claims priority under 35 U.S.C §119(a) to Japanese Patent Application No. 2012-189446 filed on Aug. 30, 2012. Each of the above applications is hereby expressly incorporated by reference, in its entirety, into the present application.

BACKGROUND OF THE INVENTION

1. Field of the Invention

The claimed invention relates to an imaging lens barrel and a method for controlling an operation of the same.

2. Description of the Related Art

With an increase in the screen size and resolution of a television apparatus, there is an increasing demand for improving the quality of images displayed on a display screen. In order to meet the demand for improving the quality of images, it is necessary to accurately detect the position of an imaging lens provided in movie and broadcasting imaging lens barrels.

For example, JP2011-27999A discloses an endoscopic device which uses an electrostatic encoder as lens position detection means and can determine the position of a lens with high accuracy. For example, JP2012-83313A discloses a position detection device which accurately detects a distance in a wide range with a simple structure and immediately detects an absolute position.

SUMMARY OF THE INVENTION

However, in both JP2011-27999A and JP2012-83313A, the accuracy of detecting the position of the imaging lens is insufficient.

An object of the claimed invention is to provide an imaging lens barrel which can detect the position of an imaging lens with high accuracy and a method of controlling an operation of the imaging lens barrel.

According to an aspect of the claimed invention, an imaging lens barrel includes: a barrel body configured to hold an imaging lens so as to be movable in an optical axis direction; a rotating body configured to rotate in accordance with an movement of the imaging lens, the rotating body including a first magnetic scale and a second magnetic scale which are formed in parallel and in which magnetic components with different wavelengths are periodically magnetized in a circumferential direction; a first magnetic sensor configured to detect, from the first magnetic scale, a first phase signal and a second phase signal having a phase shift with respect to the first phase signal in response to a rotation of the rotating body; a second magnetic sensor configured to detect, from the second magnetic scale, a third phase signal and a fourth phase signal having a phase shift with respect to the third phase signal in response to the rotation of the rotating body; a phase difference calculation section configured to calculate a phase difference between the first phase signal and the third phase signal, using the first phase signal and the second phase signal detected by the first magnetic sensor and the third phase signal and the fourth phase signal detected by the second magnetic sensor; a correction table memory that stores a plurality of correction tables which are obtained when the imaging lens is moved at different speeds and are used to correct a difference between the phase difference calculated by the phase difference calculation section and a design value of the phase difference; a phase difference correction section configured to correct the phase difference calculated by the phase difference calculation section, using the correction table corresponding to a moving speed of the imaging lens among the plurality of correction tables; and an absolute position calculation section configured to calculate an absolute position of the imaging lens from the phase difference corrected by the phase difference correction section and a predetermined relationship between the phase difference and the absolute position of the imaging lens.

Another aspect of the claimed invention provides an operation control method suitable for an imaging lens barrel. That is, there is provided a method for controlling an operation of an imaging lens barrel including a barrel body configured to hold an imaging lens so as to be movable in an optical axis direction and a rotating body configured to rotate in accordance with a movement of the imaging lens, the rotating body including a first magnetic scale and a second magnetic scale which are formed in parallel and in which magnetic components with different wavelengths are periodically magnetized in a circumferential direction. The method includes: allowing a first magnetic sensor to detect, from the first magnetic scale, a first phase signal and a second phase signal having a phase shift with respect to the first phase signal in response to a rotation of the rotating body; allowing a second magnetic sensor to detect, from the second magnetic scale, a third phase signal and a fourth phase signal having a phase shift with respect to the third phase signal in response to the rotation of the rotating body; allowing a phase difference calculation section to calculate a phase difference between the first phase signal and the third phase signal, using the first phase signal and the second phase signal detected by the first magnetic sensor and the third phase signal and the fourth phase signal detected by the second magnetic sensor; allowing a phase difference correction section to correct the phase difference calculated by the phase difference calculation section, using a correction table corresponding to a moving speed of the imaging lens among a plurality of correction tables which are obtained when the imaging lens is moved at different speeds and are used to correct a difference between the phase difference calculated by the phase difference calculation section and a design value of the phase difference; and allowing an absolute position calculation section to calculate an absolute position of the imaging lens from the phase difference corrected by the phase difference correction section and a predetermined relationship between the phase difference and the absolute position of the imaging lens.

According to the above-mentioned aspects of the claimed invention, the rotating body is rotated with the movement of the imaging lens. The first magnetic scale and the second magnetic scale in which the magnetic components with different wavelengths are periodically magnetized are formed in parallel in the rotating body. When the rotating body is rotated, the first magnetic sensor detects the first phase signal and the second phase signal having a phase shift with respect to the first phase signal from the first magnetic scale and the second magnetic sensor detects the third phase signal and the fourth phase signal having a phase shift with respect to the third phase signal from the second magnetic scale. The phase difference between the first phase signal and the third phase signal is calculated using the detected first to fourth phase signals. Since the phase difference and the absolute position of the imaging lens are uniquely determined, the absolute position of the imaging lens is calculated on the basis of the calculated phase difference. In particular, in the above-mentioned aspects of the claimed invention, the plurality of correction tables which are obtained when the imaging lens is moved at different speeds and are used to correct the difference between the calculated phase difference and the design value of the phase difference are stored. The calculated phase difference is corrected using the correction table corresponding to the moving speed of the imaging lens. Then, the absolute position of the imaging lens is calculated. Therefore, it is possible to determine the position of the imaging lens with high accuracy.

The correction table memory may store at least two correction tables which are obtained when the imaging lens is moved in different directions and indicate a difference between the phase difference calculated by the phase difference calculation section and the design value of the phase difference. In this case, the phase difference correction section may correct the phase difference calculated by the phase difference calculation section using the correction table, which corresponds to the moving direction of the imaging lens, of the at least two correction tables.

For example, the phase difference calculation section may calculate an average of n (n is an integer equal to or greater than 2) phase differences which are calculated using the first phase signal and the second phase signal detected by the first magnetic sensor and the third phase signal and the fourth phase signal detected by the second magnetic sensor.

The correction table memory may store, as the correction table, an average of differences between m (m is an integer equal to or greater than 2) phase differences including the phase difference corresponding to each movement position of the imaging lens and design values of the phase differences.

According to the claimed invention, it is possible to detect the position of the imaging lens in the lens barrel with high accuracy.

BRIEF DESCRIPTION OF THE DRAWINGS

FIG. 8 illustrates an example of a correction table.
FIG. 9 illustrates an example of the correction table.
FIG. 10 illustrates an example of the correction table.
FIG. 12 illustrates an example of the correction table.
FIG. 13 illustrates an example of the correction table.
FIG. 14 illustrates an example of the correction table.
FIG. 19 is a diagram illustrating the waveforms of signals output from the magnetic sensor device.

DESCRIPTION OF THE PREFERRED EMBODIMENTS

Figure 1:
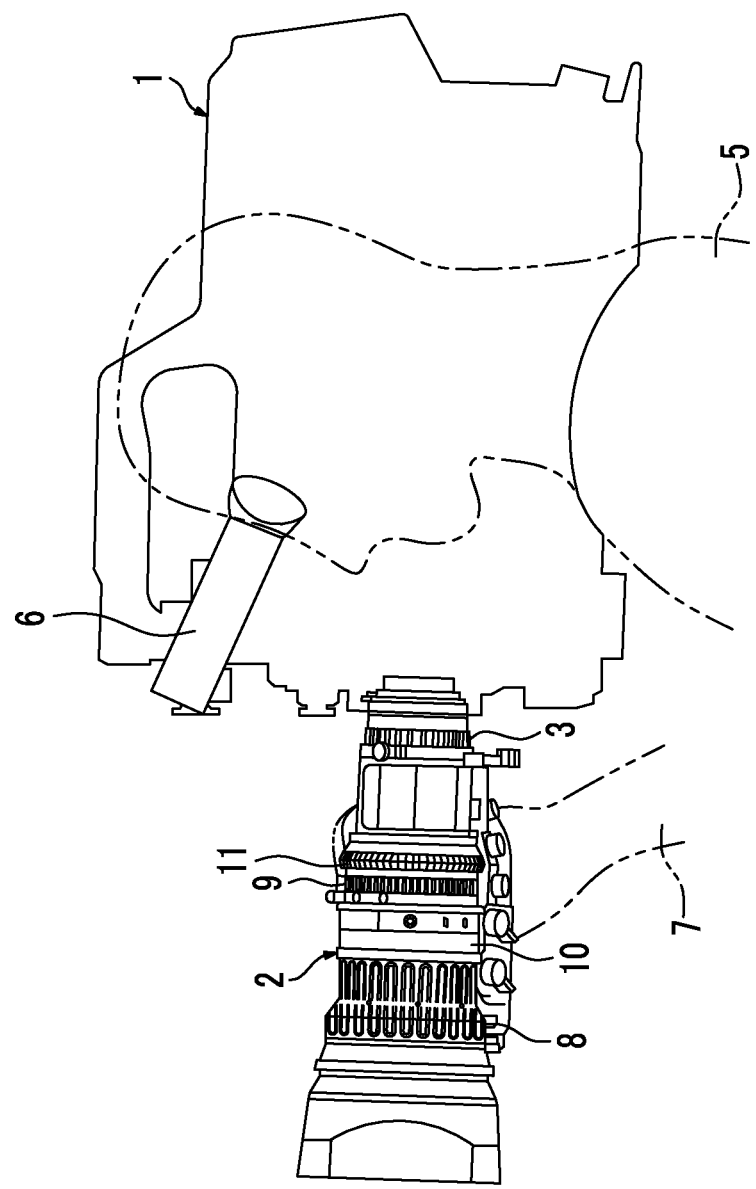
FIG. 1 illustrates the outward appearance of a lens barrel.

FIG. 1 illustrates the usage state of an imaging apparatus provided with a lens barrel (imaging lens barrel) 2 according to an exemplary embodiment of the claimed invention.

The lens barrel 2 includes a cylindrical housing 10 (barrel body). For example, imaging lenses, such as a zoom lens and a focus lens, and an iris are provided in the housing 10. A mount portion 3 is formed in a base portion of the housing 10 of the lens barrel 2. A connection portion of the mount portion 3 is detachably mounted to a lens mount portion which is provided in an anterior part of an imaging apparatus body 1 and the lens barrel 2 is fixed to the imaging apparatus body 1.

An imaging element (not illustrated) is provided in the imaging apparatus body 1 so as to be disposed on the optical axis of the lens barrel 2, with the lens barrel 2 mounted to the imaging apparatus body 1. An optical image which is focused by the lens barrel 2 is captured by the imaging element. An imaging processing device (not illustrated) which is provided in the imaging apparatus body 1 performs predetermined signal processing on an output signal from the imaging element and generates various kinds of image data.

A photographer 5 carries the imaging apparatus body 1 over the right shoulder and looks into a finder device 6 with, for example, the right eye. The photographer 5 photographs an object while holding a holding portion of the lens barrel 2 with the right hand 7 to fix the imaging apparatus.

A focus ring 8 which adjusts the focal position of the focus lens is provided at the leading end (object side) of the lens barrel 2 so as to be rotatable in the outer circumferential direction of the lens barrel 2. The photographer 5 can rotate the focus ring 8 by an arbitrary angle with the right hand 7 to adjust the focal position.

A zoom ring 9 which adjusts the zoom position of the zoom lens is provided in a middle portion of the lens barrel 2 so as to be rotatable in the outer circumferential direction of the lens barrel 2. The photographer 5 can rotate the zoom ring 9 by an arbitrary angle with the right hand 7 to adjust a zoom ratio.

An iris ring 11 for adjusting the opening of the iris is provided at the base end of the zoom ring 9 in the lens barrel 2. The iris ring 11 is also provided so as to be rotatable in the outer circumferential direction of the lens barrel 2.

Figure 2:
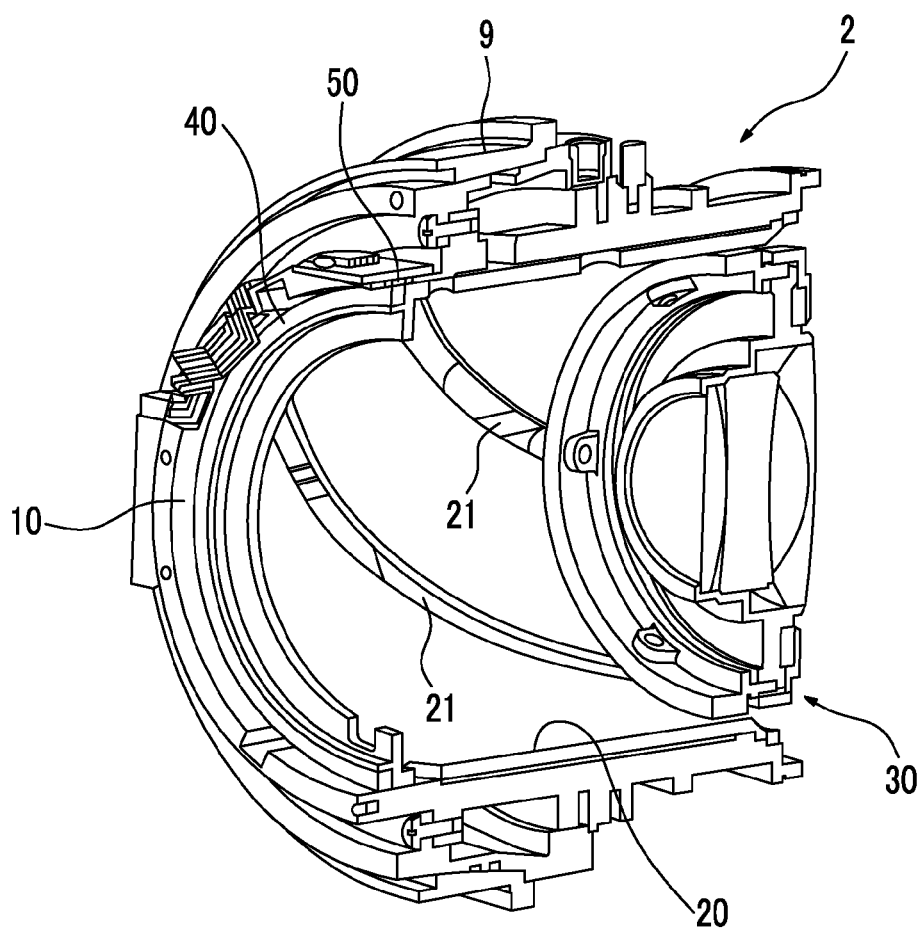
FIG. 2 is a cross-sectional perspective view illustrating a portion of the lens barrel.

FIG. 2 is a cross-sectional perspective view illustrating the vicinity of the zoom ring 9 of the lens barrel 2 illustrated in FIG. 1.

A rotating cylinder 20 (rotating body) which is rotatable about the optical axis of the lens barrel 2 and a zoom lens holding frame 30 which holds the zoom lens provided in the rotating cylinder 20 are provided in the housing 10 having the zoom ring 9 provided in the outer circumference.

The zoom lens holding frame 30 can be moved in the optical axis direction of the lens barrel 2 in operative association with the rotation of the zoom ring 9.

A cam groove 21 for converting a rectilinear motion of the zoom lens holding frame 30 into a rotational motion is formed in the rotating cylinder 20. A protruding portion of the zoom lens holding frame 30 is movably fitted to the cam groove 21. When the zoom lens holding frame 30 is moved in the optical axis direction, the rotating cylinder 20 rotates about the optical cal axis with the movement of the zoom lens holding frame 30. In this exemplary embodiment, for example, the rotating cylinder 20 can rotate 300 degrees. However, the rotating cylinder 20 may rotate at any angle other than 300 degrees.

A magnetic recording scale member 40 that extends in the circumferential direction of the rotating cylinder 20 is fixed to the outer circumference of the rotating cylinder 20. In this exemplary embodiment, the magnetic recording scale member 40 having a ring shape is used. However, the magnetic recording scale member 40 may have a shape other than the ring shape. For example, the magnetic recording scale member 40 may have a linear shape with a length corresponding to the rotatable angle of the rotating cylinder 20.

A magnetic sensor device 50 is fixed at a position that faces the magnetic recording scale member 40 in the housing 10.

Figure 3:
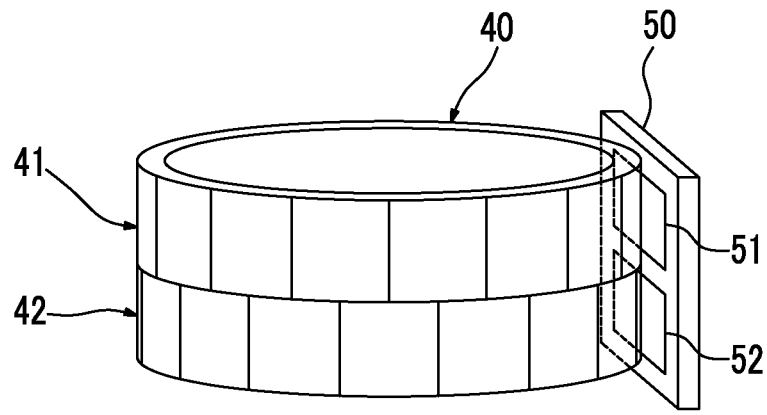
FIG. 3 illustrates a positional relationship between a magnetic scale member and a magnetic sensor device.
Figure 4:
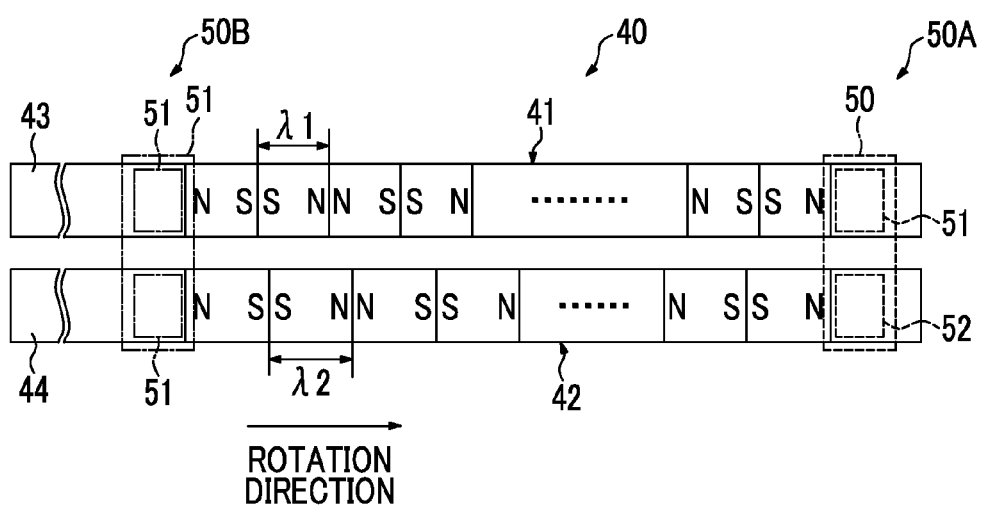
FIG. 4 illustrates a relationship between the magnetic scale member and the magnetic sensor device.

FIG. 3 is an enlarged view illustrating the magnetic recording scale member 40 and the magnetic sensor device 50 illustrated in FIG. 2. FIG. 4 is a development view illustrating the magnetic recording scale member 40 illustrated in FIG. 2.

The magnetic recording scale member 40 includes a first magnetic recording scale 41 and a second magnetic recording scale 42 which are arranged in parallel so as to deviate from each other in the optical axis direction.

As illustrated in FIG. 4, in both the first magnetic recording scale 41 and the second magnetic recording scale 42, magnetic components of the S-pole which is represented by letter S and the N-pole which is represented by letter N are periodically magnetized in supports 43 and 44, respectively. Sine wave information with a wavelength $\lambda 1$ is recorded as magnetic information on the first magnetic recording scale 41 and sine wave information with a wavelength $\lambda 2$ greater than the wavelength $\lambda 1$ is recorded as magnetic information on the second magnetic recording scale 42.

The magnetic sensor device 50 includes a first magnetic sensor 51 that is provided at a position facing the first magnetic recording scale 41 and a magnetic sensor 52 that is provided at a position facing the second magnetic recording scale 42.

The first magnetic sensor 51 includes two magneto-resistive effect elements whose electric resistance is changed depending on the magnetic field applied, detects a sine wave signal with the wavelength $\lambda 1$ and a cosine wave signal having a phase shift of, for example, 90° with respect to the sine wave signal from the magnetic information recorded on the first magnetic recording scale 41, and outputs the detected signals. Similarly, the second magnetic sensor 52 includes two magneto-resistive effect elements whose electric resistance is changed depending on the magnetic field applied, detects a sine wave signal with the wavelength $\lambda 2$ and a cosine wave signal having a phase shift of, for example, 90° with respect to the sine wave signal from the magnetic information recorded on the second magnetic recording scale 42, and outputs the detected signals.

In FIG. 4, the position of the magnetic sensor device 50 relative to the magnetic recording scale member 40 when the rotation angle of the rotating cylinder 20 is 0° (or 360°) (for example, the zoom lens is disposed at the wide end) is represented by a dashed line indicated by an arrow 50A. When the rotating cylinder 20 is rotated, the magnetic sensor device 50 relatively moves from the position represented by the dashed line indicated by the arrow 50A in FIG. 4 to the left. When the rotation angle of the rotating cylinder 20 is 300° (or) 0°, the magnetic sensor device 50 is relatively disposed at the position represented by a chain line indicated by an arrow 50B.

Figure 5:
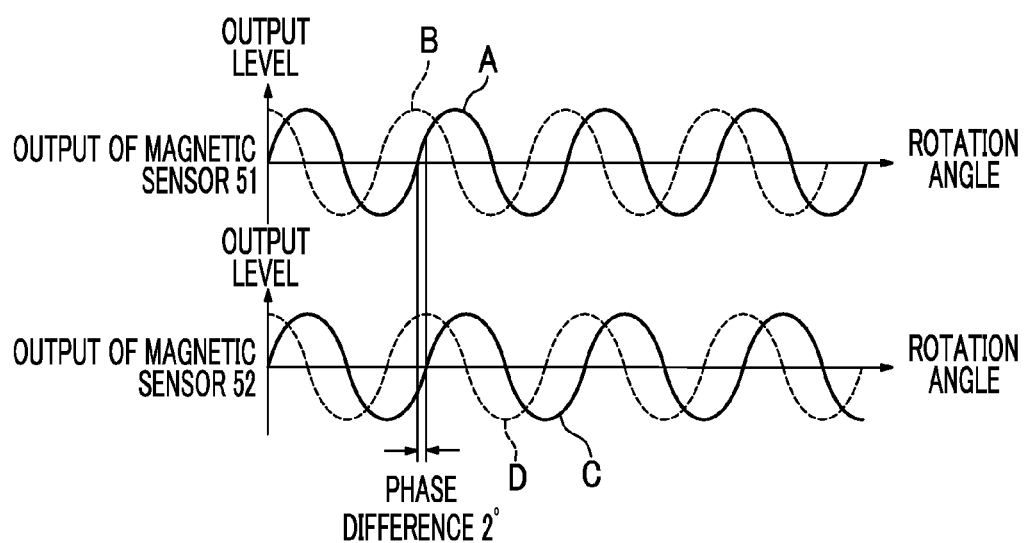
FIG. 5 is a diagram illustrating the waveforms of signals output from the magnetic sensor device.

FIG. 5 is a diagram illustrating the waveforms of signals output from the magnetic sensor device 50 when the rotating cylinder 20 illustrated in FIG. 2 is rotated.

In FIG. 5, waveforms represented by letters A and B (hereinafter, referred to as an A-phase and a B-phase) are signal waveforms which are output from the first magnetic sensor 51 facing the first magnetic recording scale 41. The B-phase has a phase shift of 90° with respect to the A-phase. That is, the A-phase is an example of a first phase signal and the B-phase is an example of a second phase signal.

In FIG. 5, waveforms represented by letters C and D (hereinafter, referred to as a C-phase and a D-phase) are signal waveforms which are output from the second magnetic sensor 52 facing the second magnetic recording scale 42. The C-phase has the same phase as the A-phase at the beginning. However, the C-phase leads the A-phase by 2° in every cycle (one pulse). In addition, the D-phase has a phase shift of 90° with respect to the C-phase. That is, the C-phase is an example of a third phase signal and the D-phase is an example of a fourth phase signal.

In this exemplary embodiment, the first magnetic recording scale 41 and the second magnetic recording scale 42 are magnetized such that 150 pulses of the A-phase and the B-phase are output and 149 pulses of the C-phase and the D-phase are output while the rotating cylinder 20 is being rotated 300°.

When the lens diameter of a general broadcasting lens device is considered, the diameter $\Phi$ of the first magnetic recording scale 41 and the second magnetic recording scale 42 is about 80 mm in practice. The wavelength $\lambda 1$ and the wavelength $\lambda 2$, which are magnetization pitches, may be respectively about 1.40 mm and 1.41 mm in order to obtain the above-mentioned number of pulses with the diameter.

Figure 6:
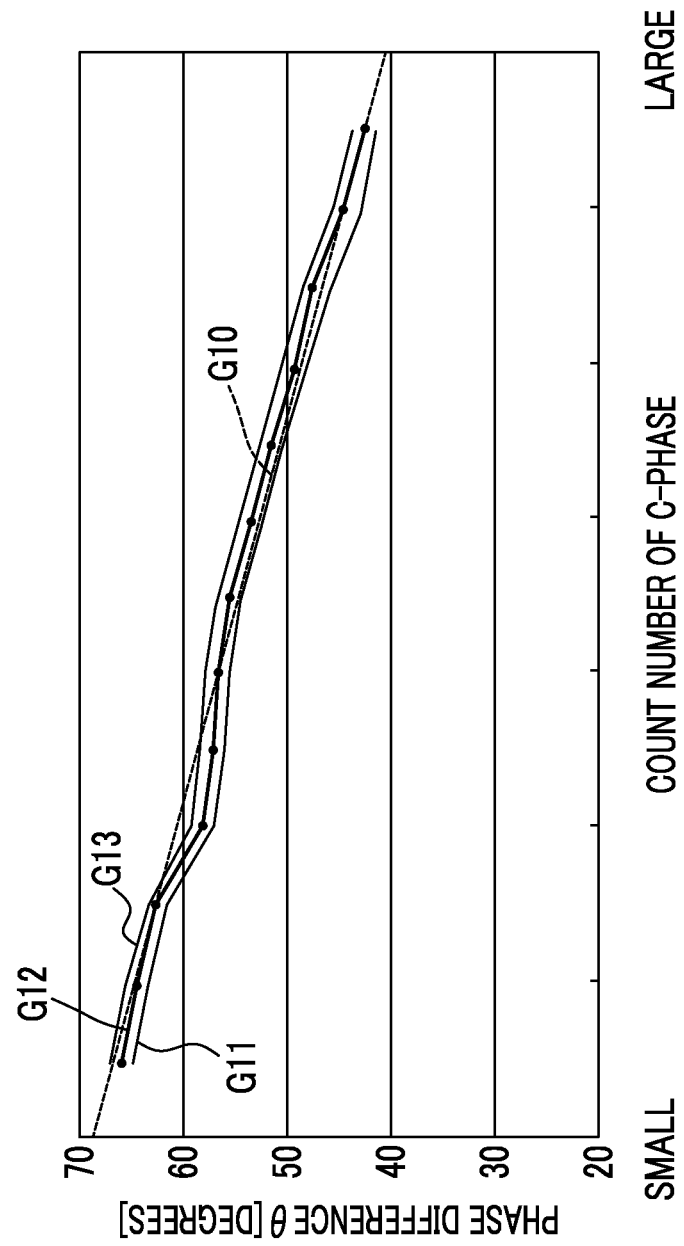
FIG. 6 illustrates a relationship between a phase difference and the count number of a C-phase.
Figure 7:
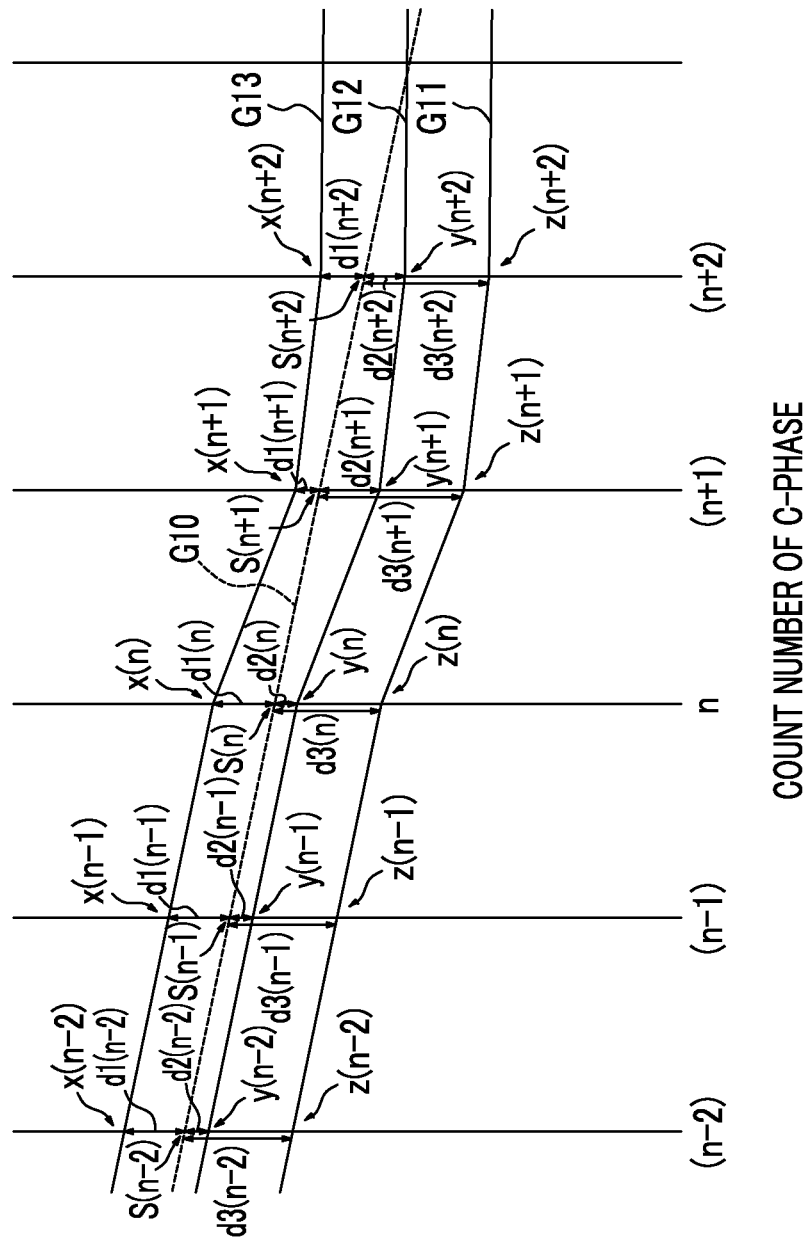
FIG. 7 illustrates the relationship between the phase difference and the count number of the C-phase.

FIG. 6 illustrates a portion of the relationship between the count number of the C-phase and a phase difference $\theta$ between the A-phase and the C-phase when the zoom lens is moved from a telephoto side to a wide side. FIG. 7 is an enlarged view illustrating a portion of FIG. 6.

In FIG. 6, the horizontal axis is the count number of the C-phase and the vertical axis is the phase difference $\theta$ between the A-phase and the C-phase. The phase difference $\theta$ between the A-phase and the C-phase is obtained by, for example, arctan(A/B)-arctan(C/D) (A, B, C, and D are the signal levels of each phase which are obtained at arbitrary time). The count number of the C-phase corresponds to the number of rotations of the zoom lens holding frame 30 (therefore, corresponds to the position of the zoom lens). When the phase difference $\theta$ is known, the count number of the C-phase, that is, the position of the zoom lens is known.

In FIG. 6, a dashed line G10 indicates an ideal design value without any error. The phase difference $\theta$ decreases gradually as the count number of the C-phase increases. In FIG. 6, solid lines G11, G12, and G13 indicate values obtained when the magnetic recording scale member 40 which is magnetized as described above is rotated. For example, when the magnetic recording scale member 40 is actually provided in the lens barrel 2, uneven magnetization occurs. Therefore, the relationship between the phase difference $\theta$ and the count number of the C-phase is not equal to the ideal design value. In addition, the relationship between the phase difference $\theta$ and the count number of the C-phase also depends on the moving speed of the zoom lens. The relationship between the phase difference $\theta$ and the count number of the C-phase varies depending on the moving speed.

It is assumed that, for example, the phase differences $\theta$ at the ideal design values when the count numbers are (n−2), (n−1), n, (n+1), and (n+2) are S(n−2), S(n−1), S(n), S(n+1), and S(n+2), respectively, with reference to FIG. 7. However, when the moving speed of the zoom lens is high, the actual phase differences $\theta$ at the count numbers of (n−2), (n−1), n, (n+1), and (n+2) are x(n−2), x(n−1), x(n), x(n+1), and x(n+2), respectively. In addition, when the moving speed of the zoom lens is medium, the actual phase differences θ at the count numbers of (n−2), (n−1), n, (n+1), and (n+2) are y(n−2), y(n−1), y(n), y(n+1), and y(n+2), respectively. When the moving speed of the zoom lens is low, the actual phase differences θ at the count numbers of (n−2), (n−1), n, (n+1), and (n+2) are z(n−2), z(n−1), z(n), z(n+1), and z(n+2), respectively.

When the moving speed of the zoom lens is high, the differences between the design values and the actual phase differences θ at the count numbers of (n−2), (n−1), n, (n+1), and (n+2) are d1(n−2), d1(n−1), d1(n), d1(n+1), and d1(n+2), respectively. When the moving speed of the zoom lens is medium, the differences between the design values and the actual phase differences θ at the count numbers of (n−2), (n−1), n, (n+1), and (n+2) are d2(n−2), d2(n−1), d2(n), d2(n+1), and d2(n+2), respectively. When the moving speed of the zoom lens is low, the differences between the design values and the actual phase differences θ at the count numbers of (n−2), (n−1), n, (n+1), and (n+2) are d3(n−2), d3(n−1), d3(n), d3(n+1), and d3(n+2), respectively.

In this exemplary embodiment, as represented by a graph G10, data indicating the relationship between the count number and the phase difference θ at the ideal design value is stored in advance and the difference between the phase difference θ and the design value is stored as the amount of correction for each moving speed in advance. In particular, in this exemplary embodiment, for the amount of correction indicating the difference between the phase difference θ and the design value, the average of the amounts of correction of the phase differences corresponding to five consecutive count numbers is stored.

FIGS. 8 to 10 illustrate examples of correction tables storing the amount of correction.

FIGS. 8 to 10 illustrate the correction tables used when the zoom lens is moved from the telephoto side to the wide side, similarly to FIGS. 6 and 7. FIGS. 8, 9, and 10 illustrate the correction tables used when the moving speed of the zoom lens is high, medium, and low, respectively.

As described above, the average of five differences between the design values and the phase differences θ corresponding to five consecutive count number is stored in the correction table.

Referring to FIG. 8, when the phase differences are x(n−2), x(n−1), x(n), x(n+1), and x(n+2), the amounts of correction are Δ1(n−2), Δ1(n−1), Δ1(n), Δ1(n+1), and Δ1(n+2), respectively. Referring to FIG. 7, when the phase difference is x(n), the amount of correction Δ1(n) is Δ1(n)={d1(n−2)+d1(n−1)+d1(n)+d1(n+1)+d1(n+2)}/5. The amounts of correction which are stored so as to be associated with the other phase differences are obtained by the same method as described above.

Referring to FIG. 9, in the correction table used when the moving speed of the zoom lens is medium, when the phase differences are y(n−2), y(n−1), y(n), y(n+1), and y(n+2), the amounts of correction are Δ2(n−2), Δ2(n−1), Δ2(n), Δ2(n+1), and Δ2(n+2), respectively. Referring to FIG. 7, when the phase difference is y(n), the amount of correction Δ2(n) is Δ2(n)={d2(n−2)+d2(n−1)+d2(n)+d2(n+1)+d2(n+2)}/5. The amounts of correction which are stored so as to be associated with the other phase differences are obtained by the same method as described above.

Referring to FIG. 10, in the correction table used when the moving speed of the zoom lens is low, when the phase differences are z(n−2), z(n−1), z(n), z(n+1), and z(n+2), the amounts of correction are Δ3(n−2), Δ3(n−1), Δ3(n), Δ3(n+1), and Δ3(n+2), respectively. Referring to FIG. 7, when the phase difference is z(n), the amount of correction Δ3(n) is Δ3(n)={d3(n−2)+d3(n−1)+d3(n)+d3(n+1)+d3(n+2)}/5. The amounts of correction which are stored so as to be associated with the other phase differences are obtained by the same method as described above.

In this exemplary embodiment, the correction table corresponding to the moving speed of the zoom lens is stored in advance. When the zoom lens is actually moved, the phase difference θ is corrected using the correction table corresponding to the moving speed of the zoom lens. The count number, that is, the position of the zoom lens is detected using the corrected phase difference θ. As such, the correction table corresponding to the moving speed of the zoom lens is used in order to prevent the calculated phase difference from varying due to calculation delay when the zoom lens is moved at a different speed.

In particular, in this exemplary embodiment, the average of five differences between the design values and the phase differences θ corresponding to five consecutive count numbers is used as the amount of correction. Therefore, even when an error occurs, averaging is performed to detect the position of the zoom lens with high accuracy. In addition, the average of five differences between the design values and the phase differences θ corresponding to five consecutive count numbers may not be used as the amount of correction.

Figure 11:
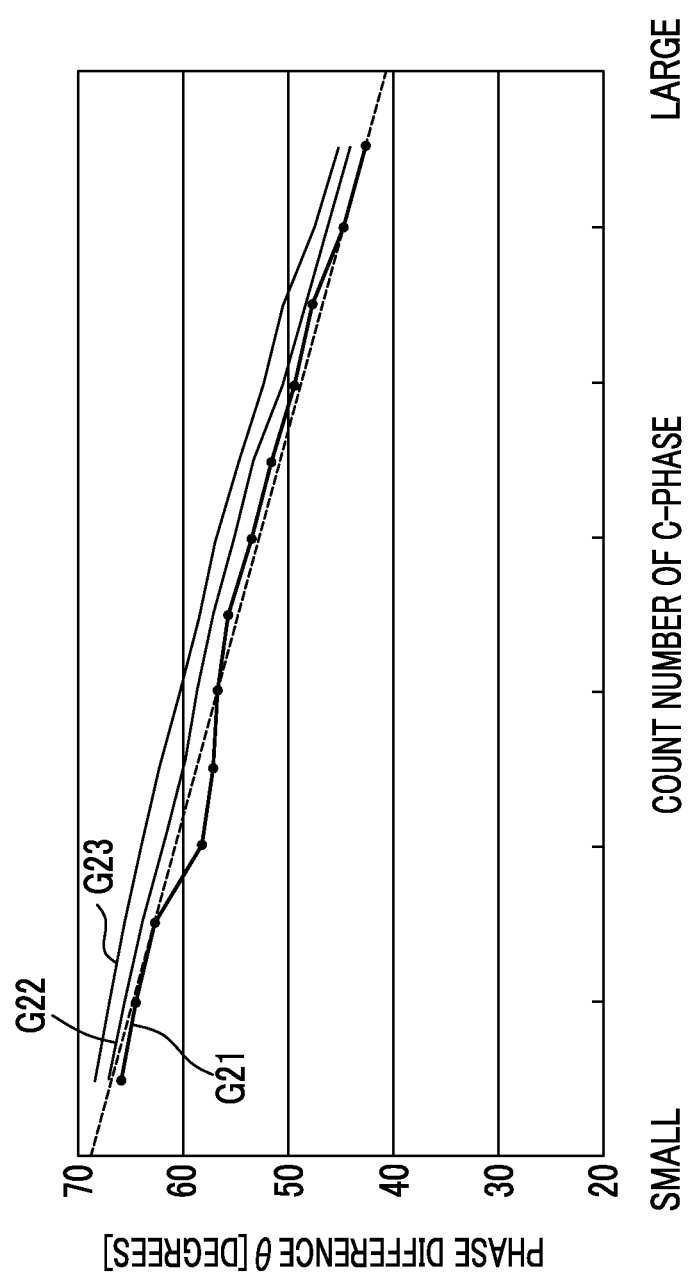
FIG. 11 illustrates the relationship between the phase difference and the count number of the C-phase.

FIG. 11 illustrates a portion of the relationship between the count number of the C-phase and the phase difference θ between the A-phase and the C-phase when the zoom lens is moved from the wide side to the telephoto side, contrary to the case illustrated in FIG. 6.

FIG. 11 illustrates a graph G20 obtained when the zoom lens is moved from the wide side to the telephoto side and graphs G21, G22, and G23 which are respectively obtained when the moving speed is high, when the moving speed is medium, and when the moving speed is low during the movement of the zoom lens from the wide side to the telephoto side, similarly to FIG. 6.

The relationship between the count number and the phase difference θ when the zoom lens is moved from the telephoto side to the wide side is not completely identical to that when the zoom lens is moved from the wide side to the telephoto side. Therefore, in this exemplary embodiment, the above-mentioned correction is performed according to the moving direction of the zoom lens.

FIGS. 12 to 14 illustrate correction tables used when the zoom lens is moved from the wide side to the telephoto side.

FIGS. 12, 13, and 14 illustrate the correction tables when the moving speed is high, when the moving speed is medium, and when the moving speed is low, respectively.

Similarly to the correction tables illustrated in FIGS. 8 to 10, the correction tables store the amount of correction so as to be associated with the phase difference. These amounts of correction are averaged as described above, but may not be averaged in such a manner.

Figure 15:
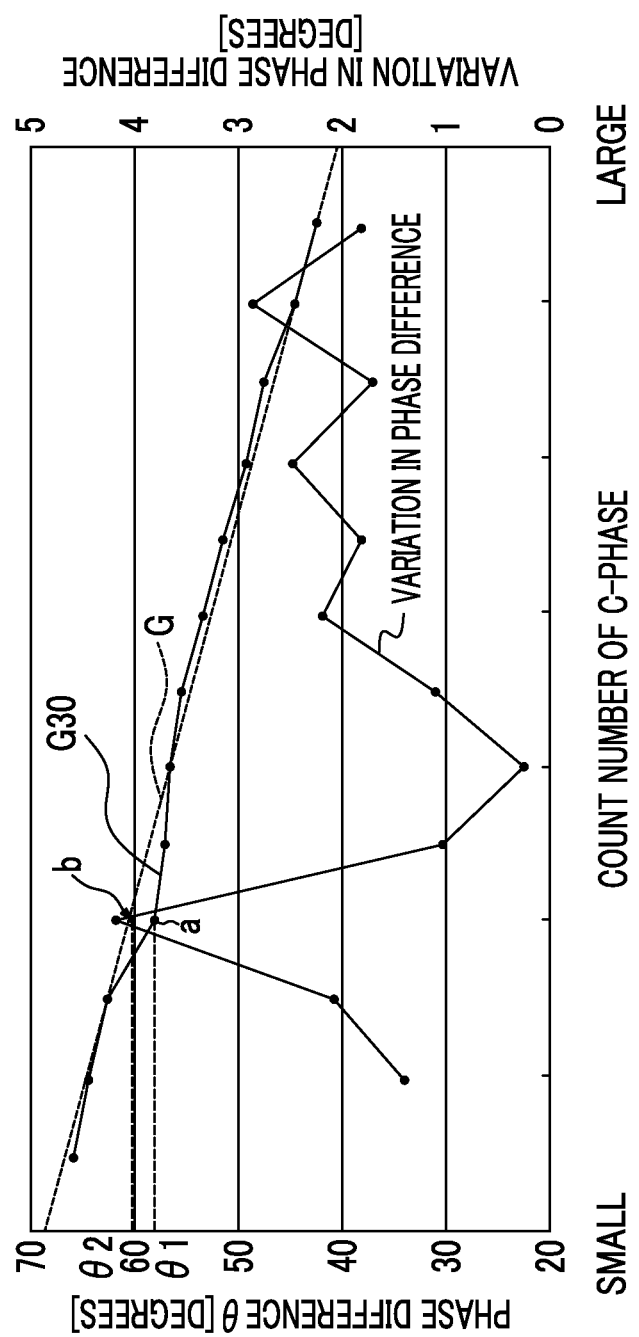
FIG. 15 illustrates the relationship between the phase difference and the count number of the C-phase.

FIG. 15 illustrates the relationship between the phase difference and the count number of the C-phase when the position of the zoom lens is actually detected. In addition, FIG. 15 illustrates a variation in the phase difference in correspondence with the count number of the C-phase.

A graph G indicates a design phase difference value and the count number of the C-phase. The graph G10 illustrated in FIG. 6 serves as the graph G at time of correction when the moving direction of the zoom lens is from the telephoto side to the wide side. The graph G20 illustrated in FIG. 11 serves as the graph G at time of correction when the moving direction of the zoom lens is from the wide side to the telephoto side. A graph G30 indicates the relationship between the phase difference and the count number obtained according to the movement of the zoom lens at time of correction.

The relationship between the phase difference and the count number obtained according to the movement of the zoom lens at time of correction is not identical to a design relationship. For example, when a phase difference θ1 is obtained as represented by a point a and the count number of the C-phase (the position of the zoom lens) is calculated using the graph G on the basis of the phase difference θ1, a position P2 is calculated as the position of the zoom lens even though the actual position of the zoon lens is a position P1. This error may not be corrected even though the correction process is performed.

Therefore, in this exemplary embodiment, the phase difference θ is calculated for each of the five count numbers of the C-phase (when the number of counts is two or more, it may not be five) and the average value of the calculated phase differences θ is calculated. Then, the position of the zoom lens is detected from the average phase difference.

In FIG. 15, the average value of a total of five phase differences, that is, the phase difference θ1 and four phase differences before and after the phase difference θ1 is calculated. When the average value is replaced with the phase difference θ1 at the point a, the phase difference at the point a becomes a phase θ2 at a point b and is close to the design value. Therefore, when the average value θ2 is used, it is possible to improve the detection accuracy of the position of the zoom lens.

Figure 16:
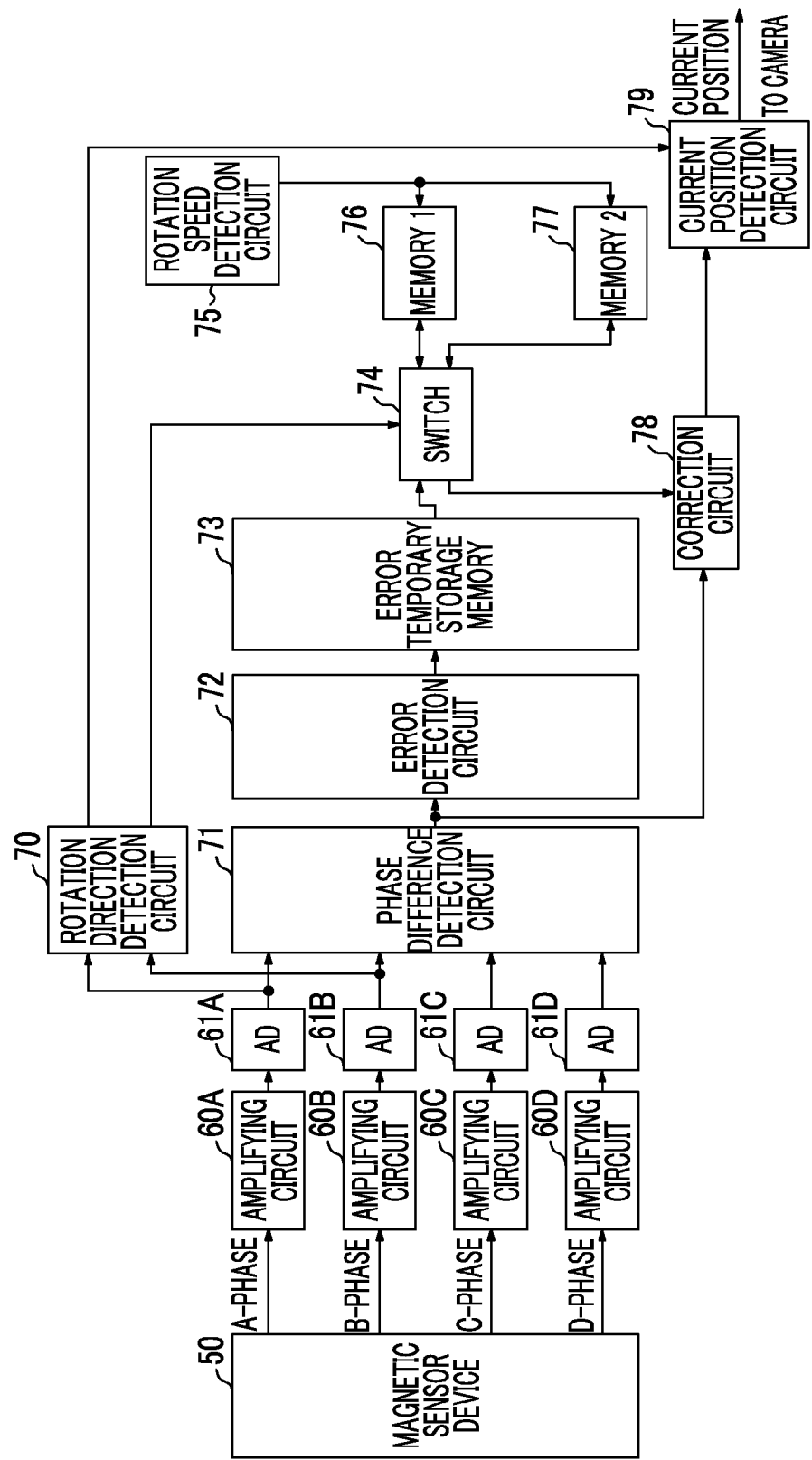
FIG. 16 a block diagram illustrating the electrical structure of a zoom lens position detection circuit.

FIG. 16 is a block diagram illustrating the electrical structure of a circuit for detecting the position of the zoom lens holding frame 30 (zoom lens) illustrated in FIG. 2. The circuit illustrated in FIG. 16 is provided in the lens barrel 2.

First, a method for generating the correction tables illustrated in FIGS. 8 to 10 as described above will be described.

At time of the factory shipment of the lens barrel 2, the zoom ring 9 is rotated such that the zoom lens moves from the telephoto side to the wide side at a first predetermined speed (a high moving speed of the zoom lens as described above). Then, as described above, the A-phase signal and the B-phase signal are output from the first magnetic sensor 51 of the magnetic sensor device 50 and the C-phase signal and the D-phase signal are output from the second magnetic sensor 52.

The A-phase signal and the B-phase signal output from the first magnetic sensor 51 are input to a first amplifying circuit 60A and a second amplifying circuit 60B, respectively, and are then amplified. The amplified A-phase signal and B-phase signal are converted into digital A-phase data and digital B-phase data by analog/digital conversion circuits 61A and 61B, respectively. The converted A-phase data and B-phase data are input to a phase difference detection circuit 71 and a rotation direction detection circuit 70. The rotation direction detection circuit 70 detects the rotation direction of the zoom ring 9 (that is, the moving direction of the zoom lens) from the input A-phase data and B-phase data.

The C-phase signal and the D-phase signal output from the second magnetic sensor 52 are input to a third amplifying circuit 60C and a fourth amplifying circuit 60D, respectively. The amplified C-phase signal and D-phase signal are converted into digital C-phase data and digital D-phase data by analog/digital conversion circuits 61C and 61D, respectively. The converted C-phase data and D-phase data are input to the phase difference detection circuit 71.

As described above, the phase difference detection circuit 71 periodically detects the phase difference θ between the A-phase and the C-phase. As described above, the value of arctan(A/B)-arctan(C/D) (A, B, C, and D are the levels of each phase which are acquired at an arbitrary time) is calculated and the phase difference θ is calculated. That is, the phase difference detection circuit 71 functions as an example of the phase difference calculation section.

Data indicating the detected phase difference θ is input to an error detection circuit 72. The error detection circuit 72 obtains data indicating the difference between the design value and the phase difference. The obtained data is stored in an error temporary storage memory 73.

The zoom ring 9 is rotated at the first predetermined speed and a process of obtaining data indicating an error is performed a total of three times. Then, the data is stored in the error temporary storage memory 73. As illustrated in FIG. 8, the correction table when the zoom lens is moved from the telephoto side to the wide side at a high speed is generated from the average of the data. The generated correction table is input to a first memory 76 through a switch circuit 74 and is then stored in the first memory 76.

Similarly, the zoom ring 9 is rotated at a second predetermined speed (the middle moving speed of the zoom lens) and the correction table illustrated in FIG. 9 is obtained. In addition, similarly, the zoom ring 9 is rotated at a third predetermined speed (the low moving speed of the zoom lens) and the correction table illustrated in FIG. 10 is obtained. The obtained correction tables are also stored in the first memory 76.

Then, the zoom lens is moved from the wide side to the telephoto side while the moving speed is changed and the correction table illustrated in FIG. 12, the correction table illustrated in FIG. 13, and the correction table illustrated in FIG. 14 are obtained, similarly to the above. The obtained correction tables are stored in a second memory 77. That is, the first memory 76 and the second memory 77 function as an example of a correction table memory.

Next, the correction process will be described with reference to FIG. 16.

When the zoom ring 9 is rotated during the actual use of the lens barrel 2, the A-phase data, the B-phase data, the C-phase data, and the D-phase data are obtained as described above. The rotation direction detection circuit 70 detects the rotation direction. Whether the zoom lens is moved from the telephoto side to the wide side or from the wide side to the telephoto side is known from the detected rotation direction. The rotation speed detection circuit 75 detects the rotation speed of the zoom ring 9 and the moving speed of the zoom lens is known. When the moving speed of the zoom lens is known, the correction tables corresponding to the moving speed are read from the first memory 76 and the second memory 77. For example, when the moving speed of the zoom lens is high, the correction table illustrated in FIG. 8 is read from the first memory 76 and the correction table illustrated in FIG. 12 is read from the second memory 77. The correction table corresponding to the rotation direction (the moving direction of the zoom lens) detected by the rotation direction detection circuit 70 passes through the switch circuit 74. For example, when the moving direction of the zoom lens is from the telephoto side to the wide side, the correction table illustrated in FIG. 8 passes through the switch circuit 74 and is input to a correction circuit 78. When the moving direction of the zoom lens is from the wide side to the telephoto side, the correction table illustrated in FIG. 12 passes through the switch circuit 74 and is input to the correction circuit 78.

Data indicating the phase difference θ output from the phase difference detection circuit 71 is also input to the correction circuit 78. The input data indicating the phase difference θ is corrected using the correction table. That is, the correction circuit 78 functions as an example of the phase difference correction section. The corrected data indicating the phase difference θ is input to a current position detection circuit 79 and the current position of the zoom lens is detected. Next, a method for detecting the current position of the zoom lens will be described.

Figure 17:
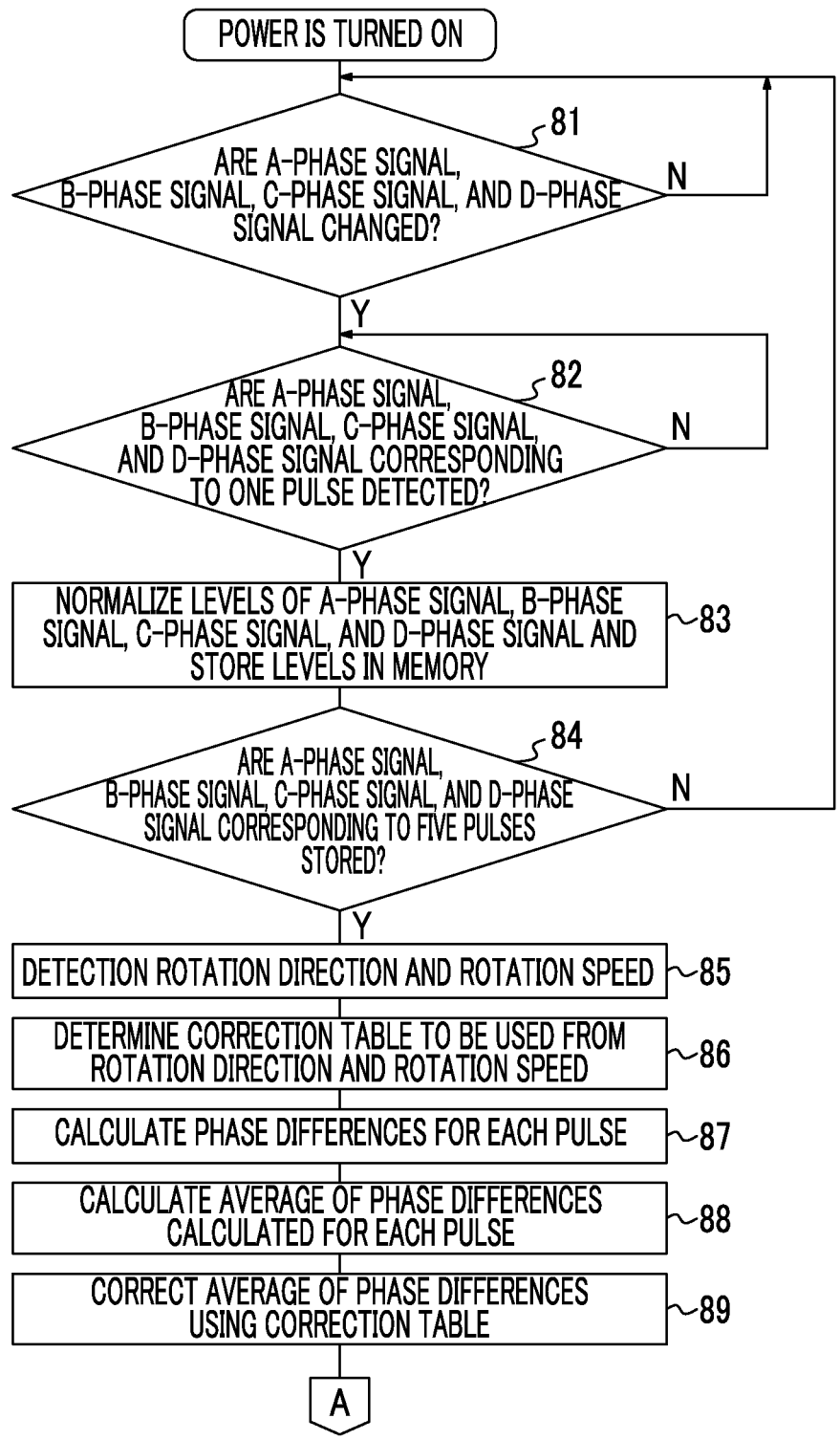
FIG. 17 is a flowchart illustrating the procedure of a zoom lens position detection process.
Figure 18:
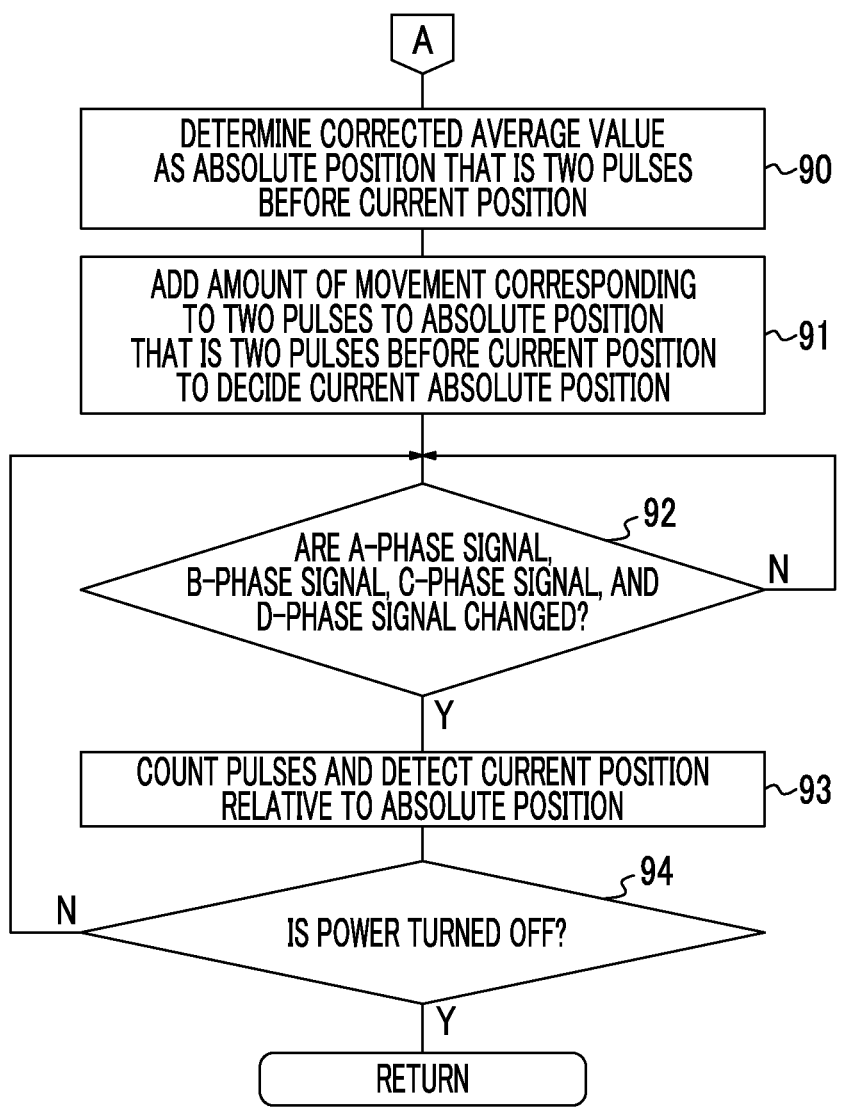
FIG. 18 is a flowchart illustrating the procedure of the zoom lens position detection process.

FIGS. 17 and 18 are flowcharts illustrating the procedure of a zoom lens position detection process. FIG. 19 is a diagram illustrating the waveforms of signals output from the magnetic sensor device 50 when the zoom ring 9 is rotated in one direction. When the rotation direction of the zoom ring 9 is changed, the method is performed from the initial process illustrated in FIG. 17.

When the user turns on the lens barrel, A-phase data, B-phase data, C-phase data, and D-phase data corresponding to the current position of the zoom lens are output from the analog/digital conversion circuits 61A, 61B, 61C, and 61D, respectively. It is assumed that power is turned on at a time T0 illustrated in FIG. 19.

When power is turned on, the phase difference detection circuit 71 checks whether the A-phase data, the B-phase data, the C-phase data, and the D-phase data are changed (Step 81). When the user rotates the zoom ring 9 in one direction after power is turned on and the A-phase data, the B-phase data, the C-phase data, and the D-phase data are changed (YES in Step 81), the phase difference detection circuit 71 determines whether the A-phase data, the B-phase data, the C-phase data, and the D-phase data corresponding to one cycle (one pulse) are detected (Step 82). When the A-phase data, the B-phase data, the C-phase data, and the D-phase data corresponding to one cycle (one pulse) are detected, the A-phase data, the B-phase data, the C-phase data, and the D-phase data corresponding to one cycle (one pulse) are normalized and stored in a memory(not illustrated) included in the phase difference detection circuit 71 (Step 83).

When the A-phase data, the B-phase data, the C-phase data, and the D-phase data corresponding to five pulses are not stored in the memory of the phase difference detection circuit 71 (NO in Step 84), the process is repeated from Step 81.

When the A-phase data, the B-phase data, the C-phase data, and the D-phase data corresponding to five pulses are stored in the memory of the phase difference detection circuit 71 (YES in Step 84), the rotation direction detection circuit 70 detects the rotation direction of the zoom ring 9 and the rotation speed detection circuit 75 detects the rotation speed of the zoom ring 9 (Step 85). The correction table used for correction is determined on the basis of the detected rotation direction and rotation speed, as described above (Step 86).

Then, the value of arctan(A/B)-arctan(C/D) is calculated for each of the A-phase data, the B-phase data, the C-phase data, and the D-phase data corresponding to five pulses, using the A-phase data, the B-phase data, the C-phase data, and the D-phase data obtained at an arbitrary time (for example, the time when the amplitude of the A-phase is 0 degrees) and the phase difference θ is calculated for each of the five pulses (Step 87).

For example, as illustrated in FIG. 19, the phase difference detection circuit 71 calculates the phase differences θ(1), θ(2), θ(3), θ(4), and θ(5) for each of the first to fifth pulses that are output after power is turned on, using the A-phase data, the B-phase data, the C-phase data, and the D-phase data which are obtained at the times T1, T2, T3, T4, and T5, respectively.

Then, the phase difference detection circuit 71 calculates the average value of the phase differences θ(1) to θ(5) (Step 88). The amount of correction corresponding to the calculated average value of the phase differences is read from the determined correction table and the average value is corrected using the read amount of correction (Step 89). The corrected average value is the phase difference in the third pulse. The absolute position of the zoom lens (the absolute position that is two pulses before the current position) corresponding to the phase difference in the third pulse is determined from the phase difference in the third pulse and data in which the design phase difference value stored in the first memory 76 is associated with the position of the zoom lens (Step 90).

Then, the current position detection circuit 79 adds or subtracts the amount of movement corresponding to two pulses to or from the determined absolute position in the rotation direction (the moving direction of the zoom lens) output from the rotation direction detection circuit 70 to decide the absolute position of the zoom lens (Step 91).

For example, when the moving direction of the zoom lens is a direction in which the phase difference θ is changed from a small value to a large value, the current position detection circuit 79 adds the amount of movement corresponding to two pulses to the determined absolute position to decide the absolute position. On the other hand, when the moving direction of the zoom lens is a direction in which the phase difference θ is changed from a large value to a small value, the current position detection circuit 79 substrates the amount of movement corresponding to two pulses from the determined absolute position to decide the absolute position. That is, the current position detection circuit 79 functions as an example of the absolute position calculation section.

The current position detection circuit 79 may output the decided absolute position to a display unit connected to the imaging apparatus body 1 to notify the user of the absolute position.

Then, when the A-phase data and the B-phase data are changed (YES in Step 92), the rotation direction detection circuit 70 compares the A-phase data and the B-phase data to determine the moving direction of the zoom lens, counts the number of pulses of the A-phase data or the B-phase data (for example, the number of pulses at 64-multiplied accuracy), and detects the relative position of the zoom lens having the decided absolute position as a reference position (Step 93).

When the lens barrel 2 is turned off (YES in Step 94), the process ends.

In the lens barrel 2 according to this exemplary embodiment, the current position of the zoom lens is determined on the basis of the corrected value of the average value of the phase differences which are calculated for each of the five pulses output from the magnetic sensor device 50. Therefore, the influence of the uneven magnetization of the magnetic recording scale member 40 or the assembly error of the lens barrel 2 is reduced and it is possible to improve the detection accuracy of the current position.

In the above description of the operation, the average value of the phase differences corresponding to five pulses is used. However, when the average value of the phase differences corresponding to seven pulses is used, the corrected value of the average value of the phase differences θ which are calculated for each of the seven pulses may be treated as a phase difference corresponding to the fourth pulse and the absolute position of the zoom lens in the fourth pulse may be calculated on the basis of the phase difference. Then, a position that deviates from the absolute position by three pulses may be decided as the absolute position.

When the average value of the phase differences corresponding to four pulses is used, the corrected value of the average value of the phase differences θ which are calculated for each of the four pulses may be treated as a phase difference corresponding to the second or third pulse and the absolute position of the zoom lens in the second or third pulse may be calculated on the basis of the phase difference. Then, a position that deviates from the absolute position by one or two pulses may be decided as the absolute position.

When odd-number pulses are used to calculate the average value of the phase differences, the phase difference detection circuit 71 shifts the absolute position corresponding to the corrected value of the average value of the phase differences θ which are calculated for each of the pulses by the quotient when the number of pulses is divided by 2 to decide the final absolute position. When even-number pulses are used, the phase difference detection circuit 71 shifts the absolute position corresponding to the corrected value of the average value of the phase differences θ which are calculated for each of the pulses by "the quotient when the number of pulses is divided by 2" or "(the quotient when the number of pulses is divided by 2)-1" to decide the final absolute position.

It is preferable to use three or more pulses, considering the accuracy of the absolute position. In addition, it is preferable that the above-mentioned number of pulses be equal to the number of pulses (about 5 to 10) which are output from the magnetic sensor device 50 according to the rotation angle of the rotating cylinder 20 (about 10° to 20° when the diameter Φ of the rotating cylinder 20 is about 80 mm) by one rotation operation. The user can know the absolute position of the zoom lens only by one operation of rotating the zoom ring 9 in a given direction after turning on the lens barrel 20. As a result, an operation of checking the absolute position is simplified.

In the above description of the operation, the phase difference is calculated using the data obtained at the time when the amplitude of the A-phase signal is 0. However, data which is obtained at an arbitrary time may be used.

When the phase difference θ calculated from the A-phase data, the B-phase data, the C-phase data, and the D-phase data which are obtained at the time when the amplitude of any of the A-phase, the B-phase, the C-phase, and the D-phase is 0 is compared to the phase difference θ calculated from the A-phase data, the B-phase data, the C-phase data, and the D-phase data which are obtained at the time when none of the A-phase, the B-phase, the C-phase, and the D-phase have an amplitude of 0, the phase difference has a value (value with a small error) that is close to the design phase difference. Therefore, when the phase difference θ is calculated for each pulse from the A-phase data, the B-phase data, the C-phase data, or the D-phase data which is obtained at the time when the amplitude of any of the A-phase, the B-phase, the C-phase, and the D-phase is 0, it is possible to improve the accuracy of the final absolute position of the zoom lens.

In the above-described exemplary embodiment, the zoom lens has been described. However, the claimed invention can also be applied to, for example, a focus lens other than the zoom lens.

What is claimed is:

1. An imaging lens barrel comprising:
a barrel body configured to hold an imaging lens so as to be movable in an optical axis direction;
a rotating body configured to rotate in accordance with an movement of the imaging lens, the rotating body including a first magnetic scale and a second magnetic scale which are formed in parallel and in which magnetic components with different wavelengths are periodically magnetized in a circumferential direction;
a first magnetic sensor configured to detect in response to a rotation of the rotating body, from the first magnetic scale, a first phase signal and a second phase signal having a phase shift with respect to the first phase signal;
a second magnetic sensor configured to detect in response to the rotation of the rotating body, from the second magnetic scale, a third phase signal and a fourth phase signal having a phase shift with respect to the third phase signal;
a phase difference calculation section configured to calculate a phase difference between the first phase signal and the third phase signal, using the first phase signal and the second phase signal detected by the first magnetic sensor and the third phase signal and the fourth phase signal detected by the second magnetic sensor;
a correction table memory that stores a plurality of correction tables which are obtained when the imaging lens is moved at different speeds and are used to correct a difference between the phase difference calculated by the phase difference calculation section and a design value of the phase difference;
a phase difference correction section configured to correct the phase difference calculated by the phase difference calculation section, using the correction table corresponding to a moving speed of the imaging lens among the plurality of correction tables; and
an absolute position calculation section configured to calculate an absolute position of the imaging lens from the phase difference corrected by the phase difference correction section and a predetermined relationship between the phase difference and the absolute position of the imaging lens.

2. The imaging lens barrel according to claim 1,
wherein the correction table memory stores two correction tables which are obtained for each of the different speeds when the imaging lens is moved in different directions and indicate a difference between the phase difference calculated by the phase difference calculation section and the design value of the phase difference, and
the phase difference correction section corrects the phase difference calculated by the phase difference calculation section using the correction table, which corresponds to the moving direction of the imaging lens, of the two correction tables.

3. The imaging lens barrel according to claim 1,
wherein the phase difference calculation section calculates an average of n phase differences which are calculated using the first phase signal and the second phase signal detected by the first magnetic sensor and the third phase signal and the fourth phase signal detected by the second magnetic sensor.

4. The imaging lens barrel according to claim 2,
wherein the phase difference calculation section calculates an average of n phase differences which are calculated using the first phase signal and the second phase signal detected by the first magnetic sensor and the third phase signal and the fourth phase signal detected by the second magnetic sensor.

5. The imaging lens barrel according to claim 3,
wherein the correction data memory stores, as the correction table, an average of differences between n phase differences including the phase difference corresponding to each movement position of the imaging lens and design values of the phase differences.

6. The imaging lens barrel according to claim 4,
wherein the correction data memory stores, as the correction table, an average of differences between n phase differences including the phase difference corresponding to each movement position of the imaging lens and design values of the phase differences.

7. A method for controlling an operation of an imaging lens barrel including a barrel body configured to hold an imaging lens so as to be movable in an optical axis direction and a rotating body configured to rotate in accordance with a movement of the imaging lens, the rotating body including a first magnetic scale and a second magnetic scale which are formed in parallel and in which magnetic components with different wavelengths are periodically magnetized in a circumferential direction, the method comprising:
    allowing a first magnetic sensor to detect in response to a rotation of the rotating body, from the first magnetic scale, a first phase signal and a second phase signal having a phase shift with respect to the first phase signal;
    allowing a second magnetic sensor to detect in response to the rotation of the rotating body, from the second magnetic scale, a third phase signal and a fourth phase signal having a phase shift with respect to the third phase signal;
    allowing a phase difference calculation section to calculate a phase difference between the first phase signal and the third phase signal, using the first phase signal and the second phase signal detected by the first magnetic sensor and the third phase signal and the fourth phase signal detected by the second magnetic sensor;
    allowing a phase difference correction section to correct the phase difference calculated by the phase difference calculation section, using a correction table corresponding to a moving speed of the imaging lens among a plurality of correction tables which are obtained when the imaging lens is moved at different speeds and are used to correct a difference between the phase difference calculated by the phase difference calculation section and a design value of the phase difference; and
    allowing an absolute position calculation section to calculate an absolute position of the imaging lens from the phase difference corrected by the phase difference correction section and a predetermined relationship between the phase difference and the absolute position of the imaging lens.

\* \* \* \* \*